June 16, 1953 G. RIDDELL ET AL 2,642,498
DAIL TELEPHONE SYSTEM-DIGIT ABSORBING SELECTOR CIRCUIT
Filed Aug. 8, 1950
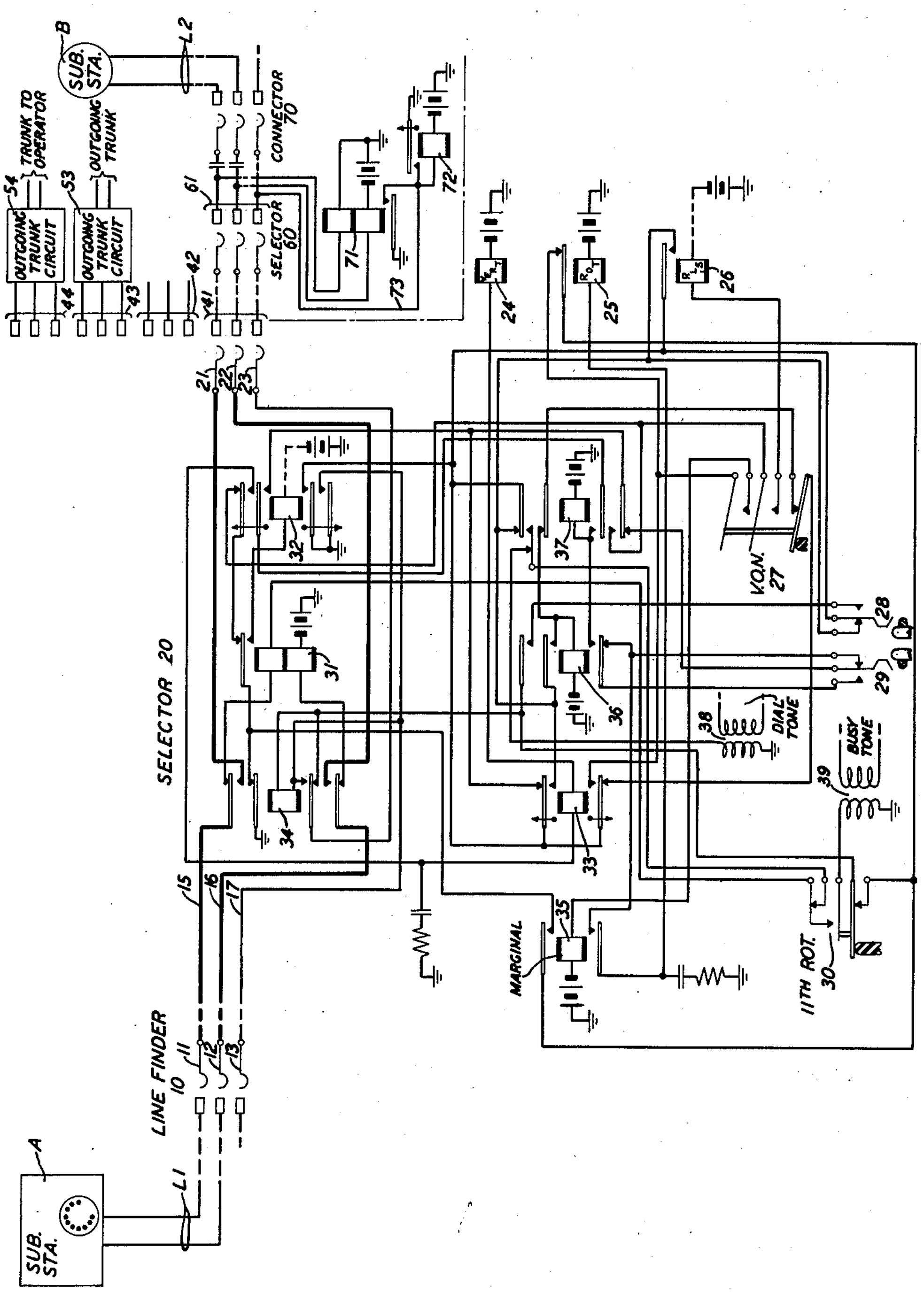
INVENTORS: G. RIDDELL
H. A. SOUCY
BY
R.O. Covell
ATTORNEY Patented June 16, 1953 2,642,498

UNITED STATES PATENT OFFICE 2,642,498

DIAL TELEPHONE SYSTEM-DIGIT ABSORBING SELECTOR CIRCUIT

George Riddell, Brooklyn, N. Y., and Harold A. Soucy, Fort Worth, Tex., assignors to Bell Telephone Laboratories, Incorporated, New York, N. Y., a corporation of New York Application August 8, 1950, Serial No. 178,262

3 Claims. (Cl. 179—18)

This invention relates to telephone systems and particularly to systems comprising two-motion step-by-step switches for use in establishing connections between calling and called telephone stations.

The objects of the invention are more efficient switching in telephone systems having uniform numbering schemes and improvement in the utility and capability of digit absorbing selectors.

It has heretofore been found desirable in automatic telephone systems to provide means for absorbing one or more digits of certain called numbers; and selector switches of the two-motion step-by-step type have been variously arranged to absorb one or more digits of any desired numerical value once only or to absorb such digits one after the other until a digit of some other numerical value is received. In some cases, digit absorbing is effected by vertical movement of the shaft and brushes of a two-motion step-by-step switch, responsive to the impulses of a train corresponding to a digit to be absorbed, followed by release of the shaft and brushes to normal position. This invention is a new and improved two-motion step-by-step digit absorbing selector switch having two sets of normal post springs each independently operable on any particular level or levels to effect (*a*) the absorbing of one or more digits repeatedly, (*b*) advance to the eleventh rotary position and return of an all-trunk-busy tone to a calling line, (*c*) the absorbing of one or more digits once only and trunk hunting responsive to the next succeeding digit, and (*d*) trunk hunting responsive to the first digit.

The drawing shows schematically a telephone exchange or office comprising a two-motion digit absorbing selector 20 arranged in accordance with the invention. The office shown further comprises subscriber telephone stations A and B of the common battery type, and line finder, selector and connector switches of the two-motion step-by-step type. A dial is shown at station A for use in controlling selector and connector switches to establish desired connections. Each subscriber's line is connected to sets of terminals in the banks of a group of line finder switches and also to sets of terminals in the banks of a group of connector switches, one switch of each of these groups being represented in the drawing by a set of brushes and a single set of terminals. The station A is shown connected by line L1 to a set of terminals in the bank of line finder switch 10 and the station B is shown connected by line L2 to a set of terminals in the bank of connector switch 70. Each of the line finder switches in a group is individually connected to a first selector switch such as the selector switch 20. The selector 20 is arranged for digit absorbing and is shown in detail, the terminal bank being represented by four sets of terminals, 41 to 44. Terminal sets 41 and 42 represent levels in each of which the terminals are connected to selectors, such as selector 60; the terminal set 43 represents a level in which the terminals are connected to outgoing trunks to other dial offices; and the terminal set 44 represents a level in which the terminals are connected to trunks to a manual switchboard. Each of the selectors, represented by the selector 60, has access to groups of connectors, and each of the connectors, such as connector 70, has access to one hundred sets of line terminals.

Reference may be had to "Automatic Telephony" by Smith and Campbell, 2nd edition, pages 53 to 65, for a complete description of two-motion step-by-step switches and their operation when used as selectors and connectors. Reference may be had to Patent 1,799,654, granted April 7, 1931, to R. L. Stokely for a complete description of the operation of a two-motion step-by-step line finder.

The selector 20 comprises, in addition to its terminal bank, a set of brushes 21, 22 and 23 mounted on a shaft adapted for vertical and rotary movement, a vertical stepping magnet 24, a rotary stepping magnet 25, a release magnet 26, a set of vertical off-normal contact springs 27 which are actuated when the shaft is moved out of its normal position, a set of springs 30 which are actuated when the shaft is rotated into the eleventh rotary step position out of engagement with the last set of terminals in any level and two sets of normal post springs 28 and 29. Each set of normal post springs 28 and 29 is separately and independently actuable on any desired level and may be similar to the normal post spring arrangement shown in Patent 1,888,700 granted to H. Sengebusch November 22, 1932. Individually associated with the selector switch are a line relay 31, a release relay 32, a changeover relay 33, a switching relay 34, a rotary stepping relay 35, and two digit absorbing control relays 36 and 37.

Assume that a call has been initiated at station A and that the line finder 10 has connected the line L1 to the associated first selector 20. The line relay 31 of selector 20 is thereupon operatively energized in a circuit which is traced from battery through the lower winding of relay 31, outer lower back contact of relay 34, conductor 16, line finder brush 12 and engaged terminal, over the calling subscriber's line loop including the impulse contacts of the dial at station A, engaged terminal and brush 11 of line finder 10, conductor 15, outer upper back contact of relay 34, upper winding of relay 31, upper back contact of the eleventh rotary step springs 30, middle upper back contact of relay 37, and through the left winding of a dial tone source 38 to ground. The operation of relay 31 closes a circuit for operating release relay 32. Relay 32 connects ground to conductor 17 thereby to maintain the line finder 10 in operated position, connecting the line L1 to the selector 20. The operation of relay 32 also closes a circuit for operating relay 36. This circuit is traced from battery through the winding of relay 36, a back contact of relay 37, a back contact of VON springs 27, a back contact of relay 33 and a front contact of relay 32, to ground. Relay 36 locks under control of relays 37 and 32 but independent of relay 33, and also under control of normal post springs 28 and relays 33 and 32 but independent of relay 37.

No further action occurs unitl the calling subscriber dials the first digit of the number of the station which is being called, relay 31 being thereupon successively released and reoperated as many times as there are units in the digit dialed. Relay 32 is slow in releasing and remains operated during the receipt of dial impulses. The first release of relay 31 closes a circuit from ground at the inner upper back contact of relay 34, through the back contact of relay 31, a front contact of relay 32, winding of relay 33 and through the winding of vertical stepping magnet 24 to battery, thereby operating relay 33 and the stepping magnet 24. The operation of stepping magnet 24 raises the shaft and brushes of switch 20 one step, the vertical off-normal springs 27 being actuated as soon as the shaft moves out of normal position. The actuation of springs 27 closes a circuit for operating relay 35, this circuit being traced from the winding of relay 35 through a front contact of springs 27 and lower front contact of relay 33, to ground at a front contact of relay 32. Relay 35 locks independent of relay 33 in a circuit traced from its winding through a front contact of vertical off-normal springs 27, back contact of rotary stepping magnet 25, and upper front contact of relay 35 to ground at a back contact of relay 34. The reoperation of line relay 31 at the end of the first impulse opens the energizing circuit for relay 33 and vertical stepping magnet 24. The stepping magnet 24 releases immediately, but relay 33 is slow to release and remains operated during the receipt of all of the impulses in a train. The release and reoperation of relay 31 responsive to each succeeding impulse of the train causes a corresponding operation and release of vertical stepping magnet 24, whereby the brushes 21, 22 and 23 of selector 20 are advanced step by step to the level corresponding to the digit dialed.

Assume first that connection is desired to an operator, in which case the digit "0" is dialed and the brushes of selector 20 are advanced in response to the first train of dial pulses received by relay 31 to the tenth level on which neither of the normal post springs 28 and 29 are operated, this level being represented by the set of terminals 44. In this case, the release of relay 33 at the end of the train of pulses closes a circuit for operatively energizing the winding of rotary stepping magnet 25. This circuit is traced from battery through the winding of stepping magnet 25, lower front contact of relay 35, normally closed contact of normal post springs 29, lower back contact of relay 37, upper back contact of relay 33, and a front contact of relay 32 to ground. The operation of stepping magnet 25 rotates the brushes 21, 22 and 23 into engagement with the first set of terminals in the selected level and opens the aforementioned holding circuit of relay 35. Relay 35 releases, in turn causing the release of rotary stepping magnet 25. The release of stepping magnet 25 closes a circuit connection from battery through the winding of relay 35, through the upper front contact of VON springs 27, back contact of stepping magnet 25, lower back contact of the eleventh rotary step springs 30, through the inner lower back contact of relay 34 and sleeve or test brush 23 to the terminal engaged thereby. If the trunk circuit connected to this set of terminals is busy, the terminal engaged by brush 23 is marked by a busy ground potential and relay 35 reoperates, stepping the brushes 21, 22 and 23 to the next set of terminals. This action is repeated until an idle set of terminals is encountered; or, if all trunks connected to the terminal sets in the selected level are busy, the brushes are advanced to the eleventh rotary position in which springs 30 are actuated thereby preventing the further reoperation of relay 35 and connecting a source of busy tone 39 to the upper winding of relay 31 to transmit an all-trunks-busy tone to the calling station. If, however, one or more of the outgoing trunks connected to terminals of the selected level are idle, relay 35 is not reoperated upon engagement of the brushes with such a set of terminals since there is no busy ground connected to the terminal engaged by brush 23. Instead, relay 34 is operated by the current in a circuit from battery through the winding of relay 35, upper front contact of VON springs 27, back contact of rotary stepping magnet 25, lower back contact of springs 30, winding of relay 34, and lowermost front contact of relay 32 to ground. Relay 35 is marginal and does not reoperate in series with the winding of relay 34. The operation of relay 34 connects ground from the lowermost front contact of relay 32, through the inner lower front contact of relay 34 to brush 23 to temporarily mark the selected set of terminals as busy until so marked by the operation of the line and release relays (not shown) of the outgoing trunk circuit 54. The operation of relay 34 disconnects conductors 15 and 16 from the winding of line relay 31 and extends the connection from the calling line through brushes 21 and 22 to the outgoing trunk circuit 54, the associated outgoing trunk terminating at an operator's position in the same or a distant office. When relay 34 operates, relay 31 releases, causing the release of relays 32 and 36 in succession; and, after relay 32 releases, the continued operation of relay 34 depends on the busy and holding ground connected in outgoing trunk circuit 54 to the terminal engaged by brush 23. When the calling subscriber restores the telephone set to normal, the line and release relays of the outgoing trunk circuit 54 are released, thereby disconnecting ground from the terminal engaged by brush 23, whereupon relay 34 releases, closing a circuit including back contacts of relays 34, 31 and 32 and the lower front of the VON springs for operating release magnet 26. The operation of release magnet 26 releases the brush shaft and the brushes are restored to normal in usual and well-known manner. The aforementioned disconnection of ground from the terminal engaged by brush 23 also causes the release and return to normal of line finder 10.

Assume next that the first train of dial pulses incoming to relay 31 of selector 20 effects the stepping of the brushes up to a level on which the normal post springs 28 are actuated and the normal post springs 29 are not actuated, such a level being represented by terminals 43. In such a case the digit dialed represents a non-existent office or an office to which the calling subscriber is not permitted to extend calls directly, calls to such an office being toll calls which are completed by calling an operator. When relay 33 releases at the end of the first train of dial pulses, the rotary stepping magnet 25 is operated as hereinbefore described to rotate the brushes to the first set of terminals, and relay 35 is reoperated each time the stepping magnet 25 releases to continue the advance of the brushes step by step into the eleventh rotary position. The circuit for reoperating relay 35 after each step is traced through the upper front contact of the VON springs 27, back contact of stepping magnet 25, lower back contact of springs 30, uppermost front contact of relay 36, front contact of normal post springs 28, and front contact of relay 32 to ground. The actuation of springs 30 prevents further operation of relay 35 and connects the trunks-busy-tone source 39 to the upper winding of relay 31 to indicate that the call cannot be completed. When the telephone is restored to normal at station A, relays 31, 32 and 36 release in succession. The release of relays 31 and 32 closes the circuit for operating release magnet 26 and the brushes 21, 22 and 23 are thereupon restored to normal. The release of relay 32 disconnects ground from conductor 17, thereby causing the line finder 10 to be restored to normal in usual and well-known manner.

Assume now that the first train of dial pulses incoming to relay 31 of selector 20 effects the stepping of the brushes up to a level on which the normal post springs 29 are actuated but the normal post springs 28 are not actuated, such a level being represented by terminals 41. When relay 33 releases at the end of the digit pulses, a circuit is closed from battery through the winding of relay 37, lower front contact of relay 36, front contact of normal post springs 29, lower back contact of relay 37, upper back contact of relay 33 and front contact of relay 32 to ground. Relay 37 is operated by the current in the described circuit and locks under control of relays 33 and 32 but independent of relay 36. Relay 36 remains operated after relay 37 operates, the holding circuit including the locking front contact of relay 36, back contact of normal post springs 28 and a front contact of relay 32. The operation of relay 37 closes a circuit for operating release magnet 26, this circuit including the lower front contact of VON springs 27, lowermost front contact of relay 37, upper back contact of relay 33 and a front contact of relay 32. The operation of magnet 26 effects the return of the shaft and brushes to normal and closes the holding circuit of relay 36 independent of springs 28 to maintain the operation of relay 36 in case springs 28 should be momentarily actuated during the return of the brush shaft to normal. When the shaft reaches normal, VON springs 27 are restored to normal, releasing magnet 26. Relay 36 is held operated in series with the back contact of springs 28 and a front contact of relay 32.

When the second digit is dialed at station A, after the first digit has been absorbed as described in the preceding paragraph, relay 31 is again alternately released and reoperated responsive to each dial pulse thus created. Relay 33 and vertical stepping magnet 24 are operated by the first release of relay 31; the stepping magnet 24 is reoperated responsive to each pulse in the train; and relay 33 remains operated until all of the impulses in the train have been received. The operation of relay 33 causes the release of relay 37 so that the operation of selector 20 responsive to a second train of impulses after absorbing the first train is similar to its operation responsive to a first train of impulses. Thus the brushes of selector 20 may be advanced repeatedly to a level on which normal post springs 29 are actuated and normal post springs 28 are not actuated, each such digit being in turn absorbed by return of the brushes to normal in the manner above described. If, after absorbing one or more digits in this manner, a digit is dialed which effects the stepping of the brushes up to a level on which neither set of normal post springs is actuated, the selector 20 trunk hunts in the selected level in the manner hereinbefore described; and, when an idle set of terminals is encountered, relay 34 operates extending the connection to a selector or to an outgoing trunk circuit depending on the particular numbering and trunking plan in the system or area in which the office represented in the drawing is located. The trunk circuit, such as trunk circuit 53, may be similar to the trunk circuit shown in Fig. 67 and described on pages 70 to 72 of the aforementioned second edition of "Automatic Telephony" by Smith and Campbell. The trunk circuit repeats succeeding trains of dial pulses transmitted from the calling station to selectively control the operation of switches to complete the desired connection. Holding ground potential is connected in the trunk circuit to the terminal engaged by brush 23 to hold relay 34 of selector 20 and to hold the line finder 10 in operated position until the connection is released by return of the telephone set to normal at station A.

If, after absorbing a digit due to the selection of a level on which the normal post springs 29 are actuated and normal post springs 28 are not actuated, the dialing of the next digit effects selection of a level in which normal post springs 28 are actuated and normal post springs 29 are not actuated, the brushes of selector 20 are advanced to the eleventh rotary position and all-trunks-busy tone is transmitted to station A in the manner hereinbefore described.

Assume next that the first train of dial pulses incoming to relay 31 of selector 20 effects the stepping of the brushes up to a level on which both of the sets of normal post springs 28 and 29 are actuated, such a level being represented by terminals 42. When relay 33 releases after the reoperation of relay 31 at the end of the last pulse of the train, a circuit is closed through the lower front contact of relay 36 and the front contact of normal post springs 29 and lowermost back contact of relay 37 for operating relay 37. With relay 37 operated and normal post springs 28 operated the operating and holding circuits of relay 36 are open and relay 36 releases. Relay 37 locks through its inner lower front contact, inner upper front contact of relay 32, upper back contact of relay 33 and inner lower front contact of relay 32. The operation of relay 37 closes a circuit from battery through the winding of release magnet 26, a front contact of VON springs 27, outer lower front contact of relay 37, upper back contact of relay 33 and inner lower front contact of relay 32 to ground. The release magnet 26 operates causing the return of the shaft and brushes of selector 20 to normal. The return of the VON springs 27 to normal opens the circuit through release magnet 26, but relay 36 cannot reoperate because relay 37 remains operated. When the calling subscriber dials the next digit of the called subscriber's directory number, relay 31, relay 33 and the vertical stepping magnet 24 are operated as hereinbefore described to step the brushes to the corresponding level. The operation of relay 33 when relay 31 releases responsive to the first pulse of the train causes the release of relay 37. Since the VON springs 27 are operated due to movement of the brush shaft out of normal position before relay 37 releases, relay 36 cannot reoperate; consequently, trunk hunting will take place in the selected level irrespective of whether either one of the sets of normal post springs 28 and 29 is, or is not, operated. Assuming the selected level to be the one represented by terminals 41, the operation of relay 34 when an idle set of terminals is encountered effects the extension of the connection from the calling line L1 through brushes 21 and 22 to a selector 60. The dial pulses created by the dialing of the next digit are transmitted through brushes 21 and 22 of selector 20 to selectively control the operation of selector 60 to select the corresponding lead, and the selector 60 is thereupon automatically operated to select an idle set of terminals, such as terminal set 61, which are connected to an idle connector 70. The line relay 71 of connector is thereupon connected in series with the calling line and dial at station A. Relay 71 operates, closing a circuit for operating slow-to-release relay 72, and relay 72 connects busy and holding ground potential to conductor 73 to hold selector 60. This ground is further connected to the terminal engaged by brush 23 to hold relay 34 operated, and is further extended through the inner lower front contact of relay 34 and conductor 17 to hold the line finder 10 in usual and well-known manner. The dialing of the remaining digits of the called subscriber's directory number effects the operation of the connector switch to select the terminals to which the called line L2 is connected, and if the line is idle, the ringer at station B is operated to signal the called station. When the telephone set is restored to normal at the calling station A, relays 71 and 72 release in succession, the connector 70 is restored to normal providing the telephone is also restored to normal at the called station B, and the release of relay 72 disconnects holding ground potential from conductor 73 to effect the return of selector 60 to normal, the release of relay 34 and return of brushes 21, 22 and 23 to normal, and the release and return to normal of the line finder 10.

It is particularly to be noted that the normal post springs 28 and 29, together with relays 36 and 37, enable the operation of selector 20 to meet the requirements of a diversity of numbering and trunking plans. As many digits may be absorbed in succession as is necessary and all levels of the switch may be used in extending connections since trunk hunting always takes place responsive to the next digit succeeding one which effects selection of a level on which both sets of normal post springs 28 and 29 are actuated. Thus trunks or selectors are connected to the levels on which blocking is effected by operation of normal post springs 28 only and to the levels on which repeated absorbing is effected by operation of normal post springs 29 only; and to effect trunk hunting on such levels, the preceding digit is one which effects digit absorbing once only and prepares the switch for trunk hunting on the next digit irrespective of whether either or both or neither of the normal post springs are actuated.

What is claimed is:

1. In a digit impulse controlled group selector switch of the two-motion step-by-step type comprising digit impulse controlled means for stepping the switch wipers to select a desired level of the terminal bank and means for advancing the wipers in a selected level to hunt for and select a set of terminals connected to an idle trunk, two separately operable sets of normal post springs, cam means for actuating one of said sets of springs on a switch level corresponding to a first particular digit value, cam means for actuating the other of said sets of springs on a switch level corresponding to a second particular digit value, cam means for simultaneously actuating both of said sets of springs on a switch level corresponding to a third particular digit value, means comprising a rotary stepping magnet rendered effective by actuation of said one set of springs for advancing the wipers of said switch to the eleventh rotary position, means comprising a release magnet rendered effective by actuation of said other set of springs for effecting the return of the wipers to normal without trunk hunting, and means comprising said rotary stepping magnet rendered effective by the simultaneous actuation of both of said sets of springs for causing trunk hunting in the level corresponding to the next train of digit impulses incoming to the selector irrespective of whether either one or both or neither of said sets of springs are actuated.

2. In a group selector of the two-motion step-by-step type comprising a set of brushes, a terminal bank divided into levels, a vertical stepping magnet, a rotary stepping magnet, a release magnet, a set of vertical off-normal contact springs, a line relay responsive to a train of dial impulses corresponding to any digital value, a release relay, a change-over relay, a rotary stepping relay and a cut-through relay, a first set of normal post springs, a second set of normal post springs, means for independently operating said first and second sets of springs, said means being effective to operate said first set alone on a level corresponding to a first particular digit value, to operate said second set alone on a level corresponding to a second particular digit value and to operate both said sets of normal post springs on a level corresponding to a third particular digit value, a first control relay, a second control relay, means for operating said first control relay responsive to the operation of said line relay, means comprising said line relay and said vertical stepping magnet for stepping the brushes up to the level corresponding to the digital value of a train of impulses incoming to said line relay, means for operating said change-over relay during the response of said line relay to a train of impulses, means comprising a front contact of said change-over relay for holding said first control relay operated while said change-over relay is operated, means including a front contact of said change-over relay for operating said rotary stepping relay, means comprising said rotary stepping relay and a back contact of said change-over relay effective upon release of said change-over relay at the end of a train of pulses for operating said rotary stepping magnet to effect selection of an idle set of terminals in a selected level and operation of said cut-through relay, said last-mentioned means comprising a front contact of said rotary stepping relay and a back contact of said second control relay and either a back contact of said second set of normal post springs or a front contact of said second set of normal post springs and a back contact of said first control relay, means comprising a back contact of said second control relay for holding said first control relay operated after said change-over relay releases, means comprising said rotary stepping magnet effective responsive to actuation of said first set of springs for advancing the brushes to an eleventh rotary position, means comprising a front contact of said first control relay and a front contact of said second set of normal post springs for operating said second control relay, means comprising a front contact of said second control relay and a back contact of said change-over relay for operating said release magnet to effect the return of the brushes to normal from any level on which said second set of normal post springs is actuated, means comprising a front contact of said release magnet for holding said first control relay operated while said brushes are being returned to normal, means comprising a back contact of said change-over relay for holding said second control relay operated after the brushes are returned to normal until said change-over relay is reoperated, and means comprising a back contact of said second control relay connected in series with the winding of said first control relay for preventing the reoperation of said first control relay after return of said brushes to normal from a level on which both of said sets of normal post springs are actuated, thereby to cause the operation of said rotary stepping magnet irrespective of whether said second set of normal post springs is actuated or is not actuated on the level to which the brushes are advanced responsive to the next train of impulses received after the simultaneous actuation of both of said sets of springs.

3. In a group selector of the two-motion step-by-step type comprising a set of brushes, a terminal bank divided into levels, a vertical stepping magnet, a rotary stepping magnet, a release magnet, a set of vertical off-normal contact springs, a set of eleventh rotary step contact springs, a line relay responsive to a train of dial impulses corresponding to any digital value, a release relay, a change-over relay, a rotary stepping relay and a cut-through relay, a first set of normal post springs, a second set of normal post springs, means for independently operating said first and second sets of springs, said means being effective to operate said first set alone on a level corresponding to a first particular digit value, to operate said second set alone on a level corresponding to a second particular digit value and to operate both said sets of normal post springs on a level corresponding to a third particular digit value, a first control relay, a second control relay, means for operating said first control relay responsive to the operation of said line relay, means comprising said line relay and said vertical stepping magnet for stepping the brushes up to the level corresponding to the digital value of a train of impulses incoming to said line relay, means for operating said change-over relay during the response of said line relay to a train of impulses, means comprising a front contact of said change-over relay for holding said first control relay operated while said change-over relay is operated, means including a front contact of said change-over relay for operating said rotary stepping relay, means comprising said rotary stepping relay and a back contact of said change-over relay effective upon release of said change-over relay at the end of a train of pulses for operating said rotary stepping magnet to effect selection of an idle set of terminals in a selected level and operation of said cut-through relay, said last-mentioned means comprising a front contact of said rotary stepping relay and a back contact of said second control relay and either a back contact of said second set of normal post springs or a front contact of said second set of normal post springs and a back contact of said first control relay, means comprising a back contact of said second control relay for holding said first control relay operated after said change-over relay releases, means comprising a front contact of said first control relay and a front contact of said first set of normal post springs for effecting the advance of the brushes to the eleventh rotary position to actuate said set of eleventh rotary step contact springs, means comprising a front contact of said first control relay and a front contact of said second set of normal post springs for operating said second control relay, means comprising a front contact of said second control relay and a back contact of said change-over relay for operating said release magnet to effect the return of the brushes to normal from any level on which said second set of normal post springs is actuated, means comprising a front contact of said release magnet for holding said first control relay operated while said brushes are being returned to normal, means comprising a back contact of said change-over relay for holding said second control relay operated after the brushes are returned to normal until said change-over relay is reoperated, and means comprising a back contact of said second control relay connected in series with the winding of said first control relay for preventing the reoperation of said first control relay after return of said brushes to normal from a level on which both of said sets of normal post springs are actuated, thereby to cause the operation of said rotary stepping magnet irrespective of whether said second set of normal post springs is actuated or is not actuated on the level to which the brushes are advanced responsive to the next train of impulses received after simultaneous actuation of both of said sets of springs.

GEORGE RIDDELL.
HAROLD A. SOUCY.

References Cited in the file of this patent

UNITED STATES PATENTS

| Number | Name | Date |
|---|---|---|
| 1,883,680 | Friendly | Oct. 18, 1932 |
| 2,258,651 | Hovland | Oct. 14, 1941 |
| 2,348,301 | Lomax | May 9, 1944 |
| 2,513,400 | Carson et al. | July 4, 1950 |